US012639336B2

(12) United States Patent
Baker et al.

(10) Patent No.: US 12,639,336 B2
(45) Date of Patent: May 26, 2026

(54) CONTAINER COMPUTE PLATFORM

(71) Applicant: Snowflake Inc., Bozeman, MT (US)

(72) Inventors: Brandon S. Baker, Redmond, WA (US); Siyuan Chen, Foster City, CA (US); Derek Denny-Brown, Seattle, WA (US); Scott C. Gray, Richmond Hill (CA); Jaroslaw Kowalski, Redmond, WA (US); Mark M. Manning, Penfield, NY (US)

(73) Assignee: Snowflake Inc., Bozeman, MT (US)

( * ) Notice: Subject to any disclaimer, the term of this patent is extended or adjusted under 35 U.S.C. 154(b) by 140 days.

(21) Appl. No.: 18/600,321

(22) Filed: Mar. 8, 2024

(65) Prior Publication Data

US 2025/0284710 A1     Sep. 11, 2025

(51) Int. Cl.
*G06F 16/28*     (2019.01)
*G06F 21/57*     (2013.01)

(52) U.S. Cl.
CPC .......... *G06F 16/283* (2019.01); *G06F 21/577* (2013.01); *G06F 2221/034* (2013.01)

(58) Field of Classification Search
None
See application file for complete search history.

(56) References Cited

U.S. PATENT DOCUMENTS 11,281,443 B1 *     3/2022     Brandes .............. G06F 16/1748
11,755,311 B1 *     9/2023     Carru .................. G06F 9/44536
                                                          717/168

11,803,373 B1 *     10/2023     Carru ........................ G06F 8/71
2006/0089932 A1 *     4/2006     Buehler .............. G06F 21/6218
                                                          707/999.009
2013/0205028 A1 *     8/2013     Crockett .............. G06F 9/5066
                                                          709/226
2013/0247133 A1 *     9/2013     Price ..................... G06F 21/577
                                                          726/1
2017/0180346 A1 *     6/2017     Suarez ................ G06F 9/45558
2018/0069804 A1 *     3/2018     Laplanche .......... G06F 9/45558
2023/0054696 A1 *     2/2023     Kappes ................. G06F 9/5011

OTHER PUBLICATIONS

Goyal, Ankur, "Headless business intelligence", [Online]. Retrieved from the Internet: https: basecase.vc blog headless-bi, (Jan. 7, 2021), 7 pages.

* cited by examiner

*Primary Examiner* — Kaveh Abrishamkar

(74) *Attorney, Agent, or Firm* — Schwegman Lundberg & Woessner, P.A.

(57) ABSTRACT

A data platform for executing containers is provided. In some examples, the data platform receives an application from an application package of a provider account, the application including a setup script and a manifest of a service. The data platform activates access roles based on the manifest and creates the service and a compute pool using the setup script and a specification file accessed from the application package using an access role. The service is executed in the compute pool, accessing objects of the application package and of the data platform using the access roles.

27 Claims, 8 Drawing Sheets

CONTAINER COMPUTE PLATFORM

TECHNICAL FIELD

Examples of the disclosure relate generally to data platforms and, more specifically, to executing containers.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems. Users may develop applications that execute on data platforms.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
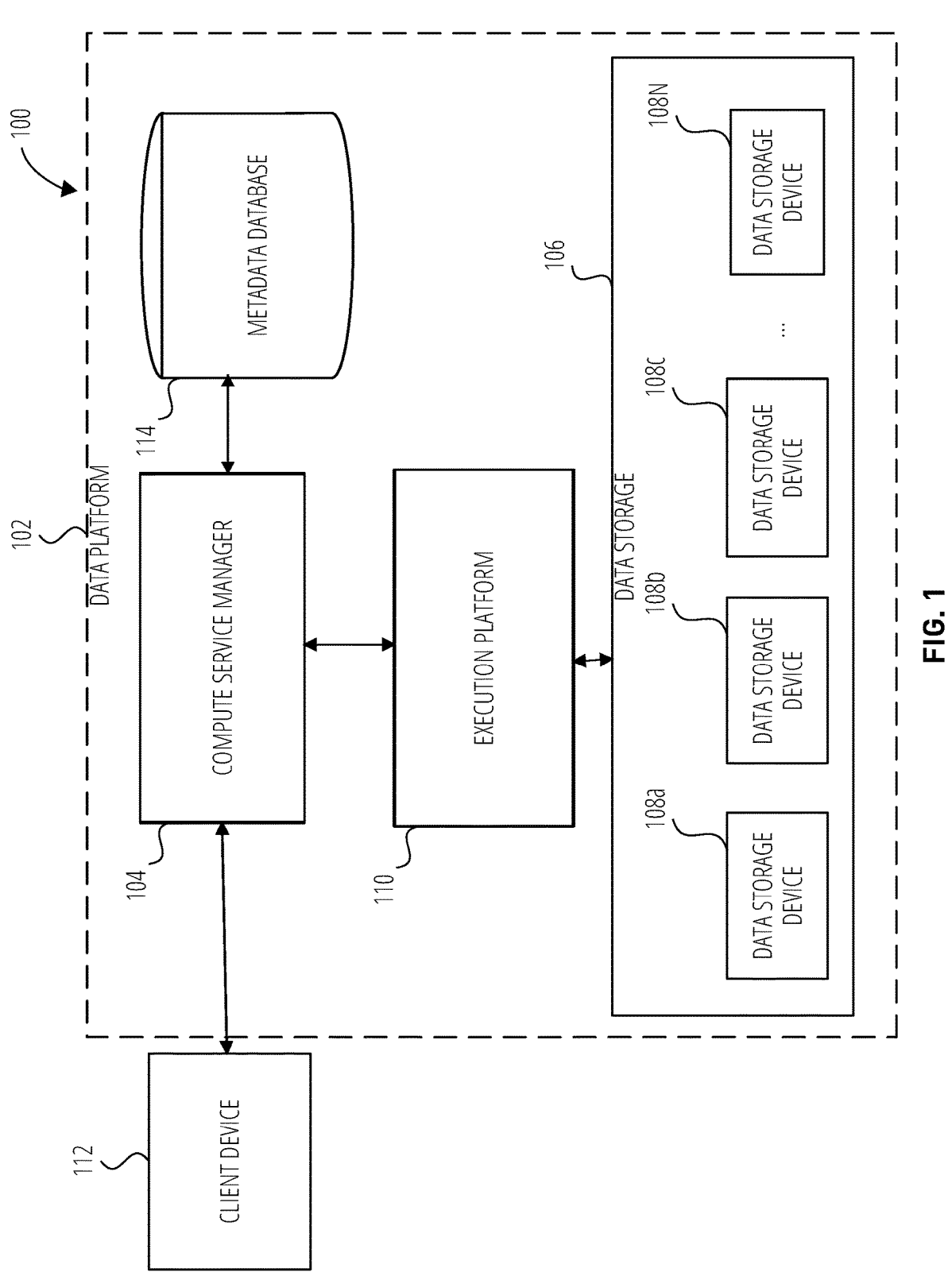
FIG. 1 illustrates an example computing environment that includes a network-based data platform in communication with a cloud storage provider user system, according to some examples.

Data platforms, which may be structured as on-premises or network-based systems like cloud-based data platforms, are utilized for a wide array of data storage and access operations. These platforms can support various data processing types, including Online Transactional Processing (OLTP), Online Analytical Processing (OLAP), or a combination thereof, and may comprise relational database management systems (RDBMS) or other database management systems.

A provider user may develop applications that execute on a data platform owned by a data platform operator within a context of a consumer user account. It is desirable to have the applications execute within an environment that protects the data and execution resources of the provider user, the consumer user, and the data platform operator.

It is challenging to protect intellectual property of the provider user while enabling the execution of provider applications within a consumer's environment. Prior solutions often required a trade-off between exposing provider code to the consumer or hosting consumer data on provider systems, which could lead to potential security and privacy issues.

In some examples, a data platform allows for the secure execution of provider applications within a consumer's environment on the data platform. The data platform provides for the isolation of the provider user's code from the consumer user's data, enabling the provider user's applications to execute without compromising sensitive information.

In some examples, the data platform utilizes exclusive compute pools that are dedicated to the execution of service containers of an application provided by a provider user. These compute pools are isolated from other services and resources, providing a secure environment for service container execution. Access to these compute pools is managed through specific access roles that are exclusive to the service container and not associated with any user account.

In some examples, services and functions of a service container communicate with external networks through configurations controlled by the consumer account. This feature allows services to interact with external systems while adhering to the security protocols of the data platform.

In some examples, the deployment and configuration of services are automated through a setup script and a service specification file. The setup script provides instructions for creating necessary resources for service execution, while the service specification file details the configuration of the service, including container images and versions.

In some examples, a data platform receives an application from a provider account's application package, which includes a setup script and a manifest detailing a service. The data platform activates specific access roles as dictated by the manifest. The data platform uses the setup script and a specification file, obtained from the application package, to create both the service and a compute pool. The data platform then executes the service within the compute pool, with the service accessing objects from both the application package and the data platform, all under the governance of the activated access roles.

In some examples, a service accesses objects of a consumer account through permissions granted by a consumer user.

In some examples, the data platform creates a query warehouse using the setup script. The service uses this query warehouse, along with the access roles, to query objects within the data platform.

In some examples, the data platform stores the manifest, the setup script, and the specification file in a hidden repository within the provider account, making it inaccessible to the provider and the consumer account users.

In some examples, the data platform includes a service specification file that lists container images and corresponding versions, which are used by the service.

In some examples, the data platform scans the container images for security vulnerabilities before the service is executed within the compute pool.

In some examples, the data platform isolates the compute pool to prevent the service from accessing services or resources not specified in the application package.

In some examples, the data platform dedicates the compute pool exclusively to the service.

In some examples, the data platform enables the service to communicate with external networks through an external access integration, which is configured and controlled by the consumer account.

In some examples, the data platform defines network rules for the external access integration through the setup script, controlling the service's communication with external networks.

FIG. 1 illustrates an example computing environment 100 that includes a data platform 102 in communication with a client device 112, according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 108a, data storage device 108b, data storage device 108c, and data storage device 108N. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by provider users and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 108a to data storage device 108N are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 108a to data storage device 108N in the data storage 106. Thus, the computing resources and cache resources are not restricted to a specific one of the data storage device 108a to data storage device 108N. Instead, all computing resources and all cache resources may retrieve data from, and store data to, any of the data storage resources in the data storage 106.

Figure 2:
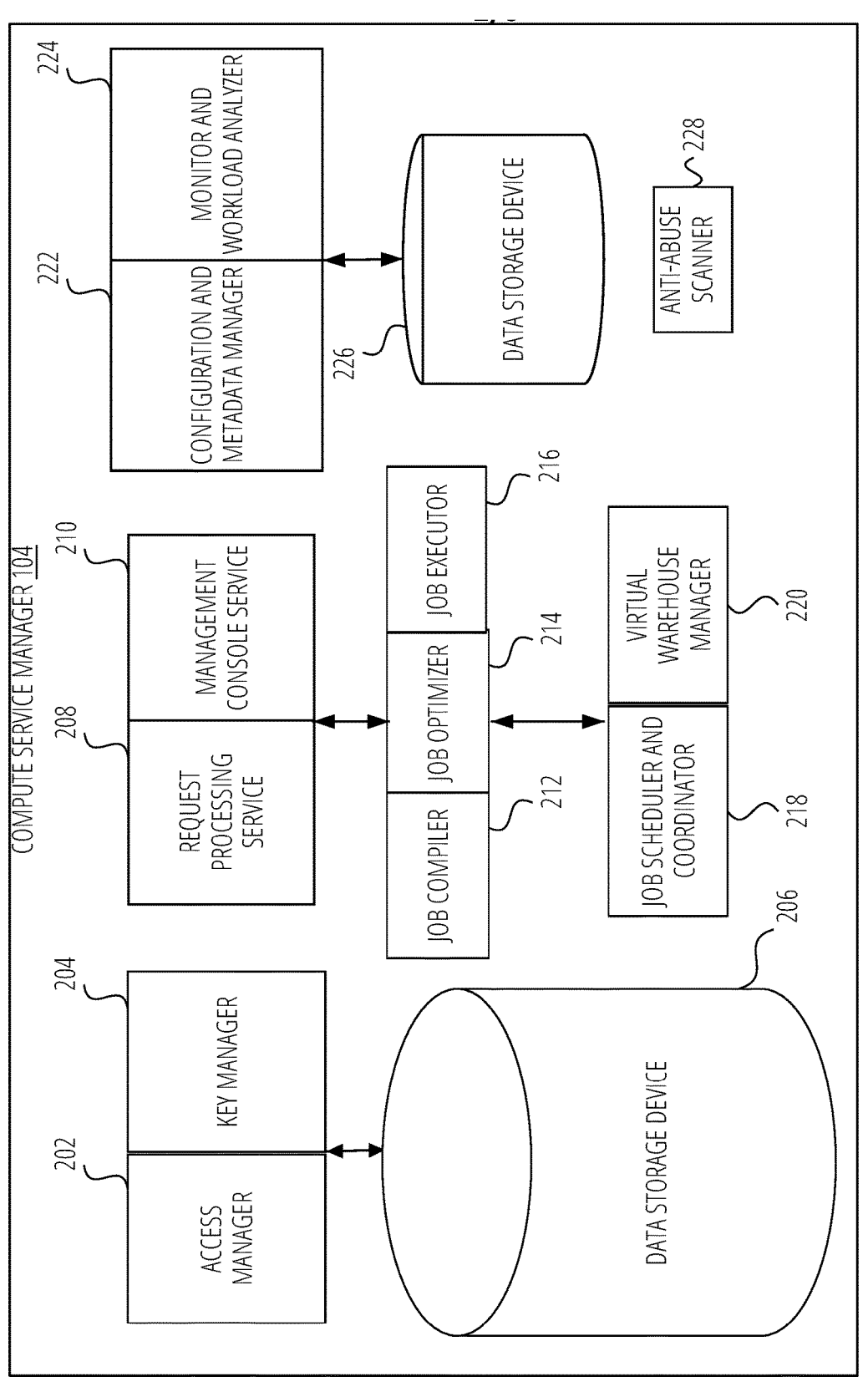
FIG. 2 is a block diagram illustrating components of a compute service manager, according to some examples.

FIG. 2 is a block diagram illustrating components of the compute service manager 104, according to some examples. As shown in FIG. 2, the compute service manager 104 includes an access manager 202, and a key manager 204. Access manager 202 handles authentication and authorization tasks for the systems described herein. Key manager

204 manages storage and authentication of keys used during authentication and authorization tasks. For example, access manager 202 and key manager 204 manage the keys used to access data stored in remote storage devices (e.g., data storage devices in data storage data storage device 206). As used herein, the remote storage devices may also be referred to as "persistent storage devices" or "shared storage devices."

In some examples, the access manager 202 operates within a data platform to control access to various objects of the data platform using Role-Based Access Control (RBAC). The access manager 202 is a component that manages authentication and authorization tasks, providing for authorized entities to access specific resources within the data platform. This component plays a role in maintaining the security and integrity of the data platform by enforcing access policies defined through RBAC.

In some examples, RBAC is implemented by defining roles within the data platform, where each role is associated with a specific set of permissions. These permissions determine the actions that entities assigned to the role can perform on various objects within the data platform. The access manager 202 utilizes these roles to make access control decisions, allowing or denying requests based on the roles assigned to the requesting entity and the permissions associated with those roles.

In some examples, a role includes a set of permissions or privileges assigned to an entity (which could be a user, a group, a service, or an automated process) that defines the level of access the entity has to various resources within the data platform 102. Access roles are components of RBAC systems, which are used to restrict access to authorized users. Access roles control what actions an entity can perform, such as reading, writing, executing, or deleting data or objects within the data platform. Access roles help maintain security and operational integrity by ensuring that entities can only access the resources necessary for their function, thereby preventing unauthorized access or actions that could compromise the system.

In some examples, access roles are used to define the permissions that an application uses to operate correctly within the data platform environment. This can include the ability to create and manage compute resources, access databases, execute services, and interact with external systems. In some examples an access role encapsulates the security and access requirements of an application, and is granted to the application or its components (such as services or functions) rather than individual users. This allows for the management of permissions at the application level, simplifying the security model and making it easier to deploy and manage applications within the data platform 102.

In some examples, access roles are granted to an application by a provider user that provides the application for deployment on the data platform 102. A provider user granted access role allows the application to access objects owned by the provider user and associated with a provider user account.

In some examples, access roles are granted to an application by a consumer user that uses the application from within a consumer user account. A consumer user granted access role allows the application to access objects owned by the consumer user and associated with a consumer user account.

In some examples, access roles are granted to an application by the data platform 102. A data platform granted access role allows the application to access objects of the platform 102 that are owned by the data platform 102.

In some examples, a consumer access role is a type of role that is associated with an application within the data platform 102. The consumer access role is granted by an application to a consumer user and used by the consumer user to access objects of the application such as, but not limited to, services, functions, data objects, and the like.

In some examples, the data platform creates specific access roles based on a manifest of an application received from an application package. These access roles are activated by the access manager 202 and are used to govern access to objects used by the application during operation. For example, an access role may grant the application the ability to create a compute pool and execute a service within that compute pool. The access manager 202 provides that an application, or entities authorized by the application, can perform actions permitted by the access role.

In some examples, the access manager 202 also controls access to objects of the data platform using the access roles during the execution of the service within the compute pool. The service accesses objects of the application package and of the data platform under the governance of the activated access roles. The access manager 202 checks the permissions associated with the access roles against the access requests made by the service, granting or denying these requests based on the defined RBAC policies.

In some examples, the role of the access manager 202 extends to managing access to hidden repositories within a provider account, where the application package is stored. The access manager 202 uses RBAC policies to restrict access to a hidden repository storing one or more components of the application and, providing for the one or more components of the application package to be accessible to entities with the appropriate access role. This mechanism protects the application package from unauthorized access, preserving the integrity of the provider's intellectual property.

In some examples, the access manager 202 implements RBAC roles to isolate the compute pool, preventing the service from accessing other services or resources not specified in the application package. This isolation is achieved by defining access roles that explicitly limit the service's permissions to the resources provided for the operation of the service, thereby enhancing the security of the service execution environment.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 304*a*) may need to communicate with another execution node (e.g., execution node 304*b*), and should be disallowed from communicating with a third execution node (e.g., execution node 316*a*) and any such illicit communication can be recorded (e.g., in a log or other location). Also, the information stored on a given execution node is restricted to data relevant to the current query and any other data is unusable, rendered so by destruction or encryption where the key is unavailable.

The compute service manager 104 further comprises an anti-abuse scanner 228 that monitors creation of application packages created by content provider users of the data platform 102. When a new application package is created by a content provider user, the anti-abuse scanner 228 scans the application package to determine if the application package contains content that is harmful, malicious, and the like. If such content is found, the anti-abuse scanner 228 prevents release of the application package by the content provider user.

In some examples, the anti-abuse scanner 228 is a component of another system that the compute service manager 104 communicates with via a network of the like.

Figure 3:
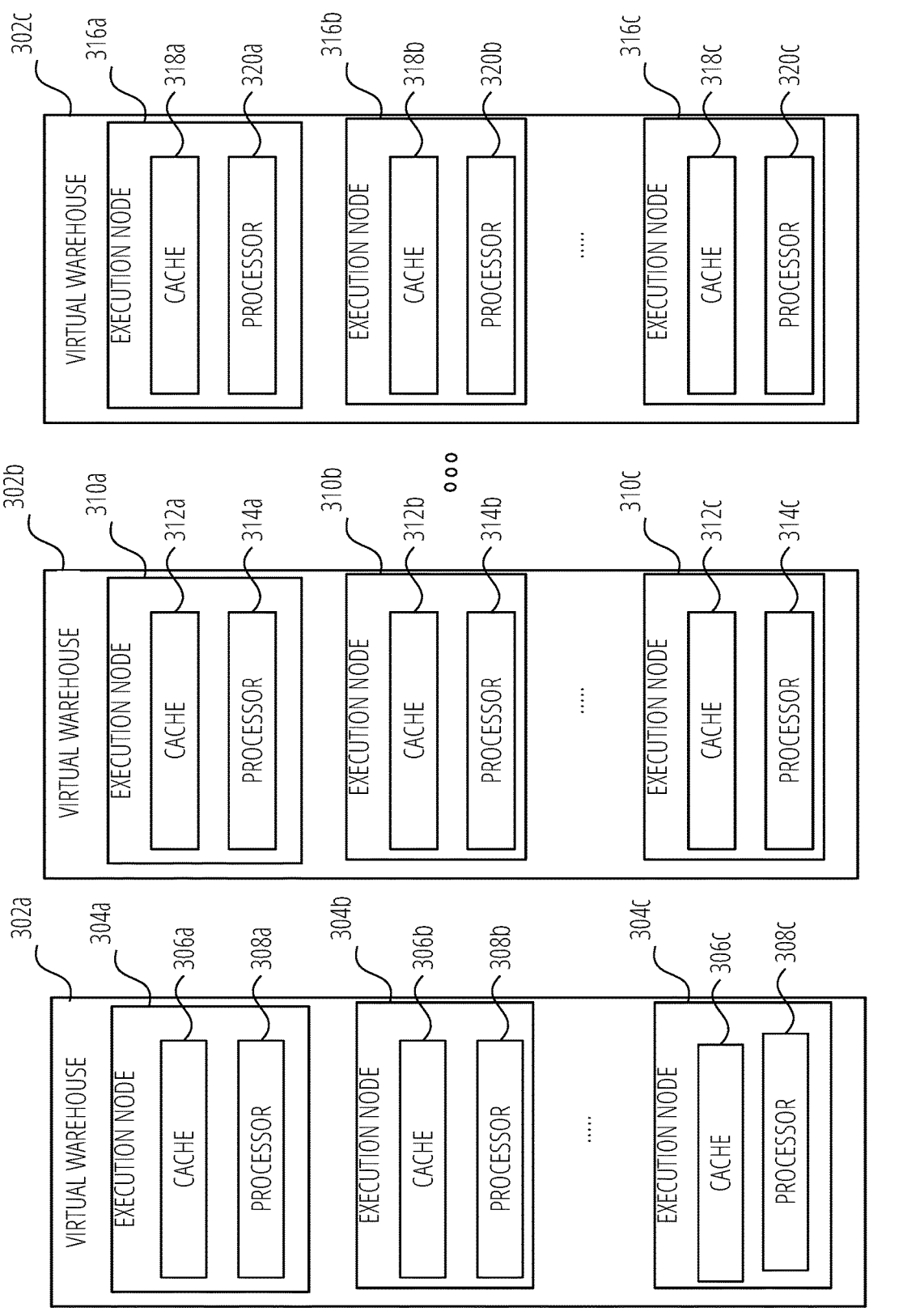
FIG. 3 is a block diagram illustrating components of an execution platform, according to some examples.

FIG. 3 is a block diagram illustrating components of the execution platform 110, according to some examples. As shown in FIG. 3, the execution platform 110 includes multiple virtual warehouses, including virtual warehouse 302a, and virtual warehouse 302b to virtual warehouse 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 302a includes a plurality of execution nodes as exemplified by execution node 304a, execution node 304b, and execution node 304c. Execution node 304a includes cache 306a and a processor 308a. Execution node 304b includes cache 306b and processor 308b. Execution node 304c includes cache 306c and processor 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 302a discussed above, virtual warehouse 302b includes a plurality of execution nodes as exemplified by execution node 310a, execution node 310b, and execution node 304c. Execution node 304a includes cache 312a and processor 314a. Execution node 310b includes cache 312b and processor 314b. Execution node 310c includes cache 312c and processor 314c. Additionally, virtual warehouse 302c includes a plurality of execution nodes as exemplified by execution node 316a, execution node 316b, and execution node 316c. Execution node 316a includes cache 318a and processor 320a. Execution node 316b includes cache 318b and processor 320b. Execution node 316c includes cache 318c and processor 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 302a implements execution node 304a and execution node 304b on one computing platform at a geographic location and implements execution node 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
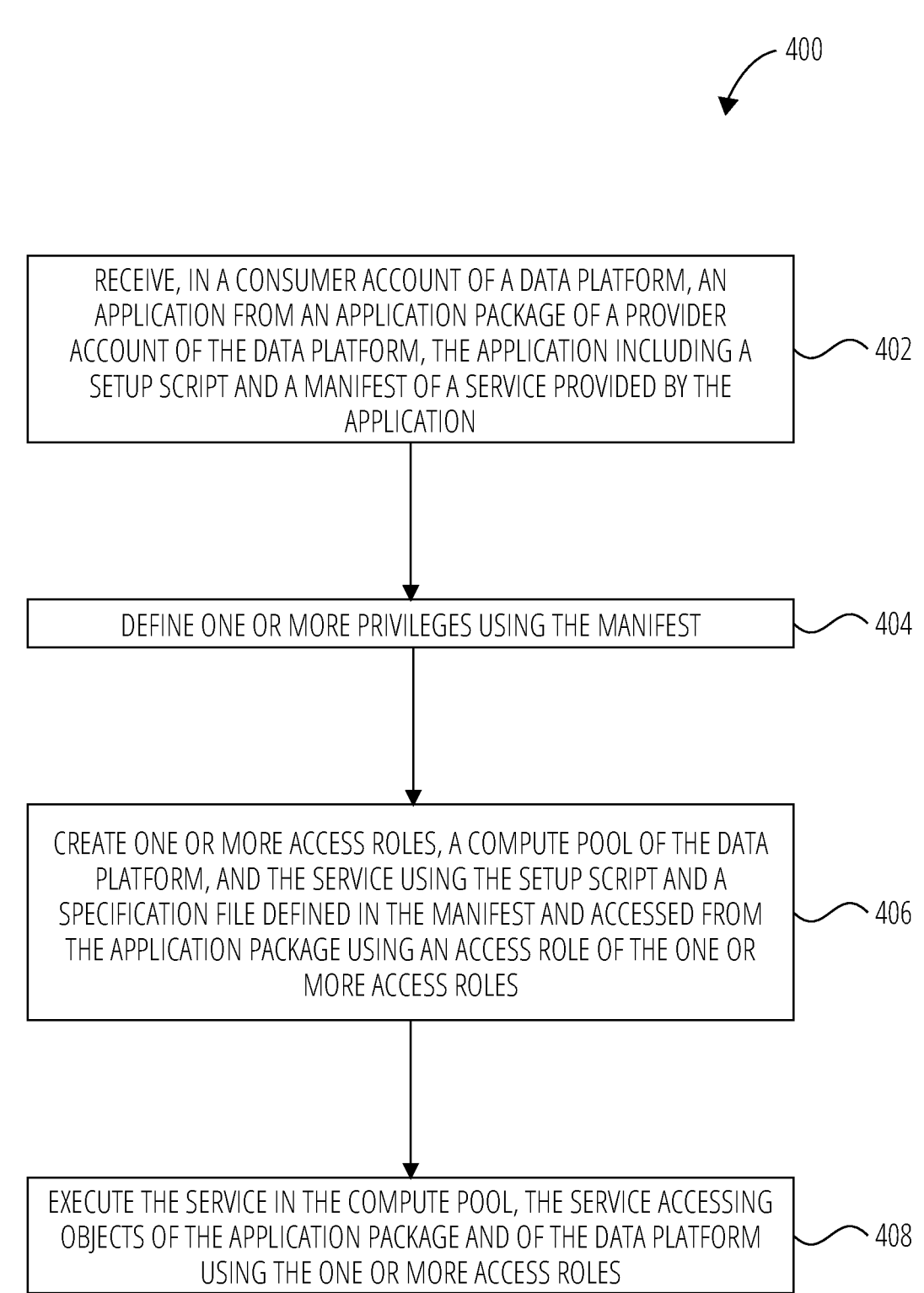
FIG. 4A illustrates a container compute method 400 in accordance with one embodiment.
Figure 4B:
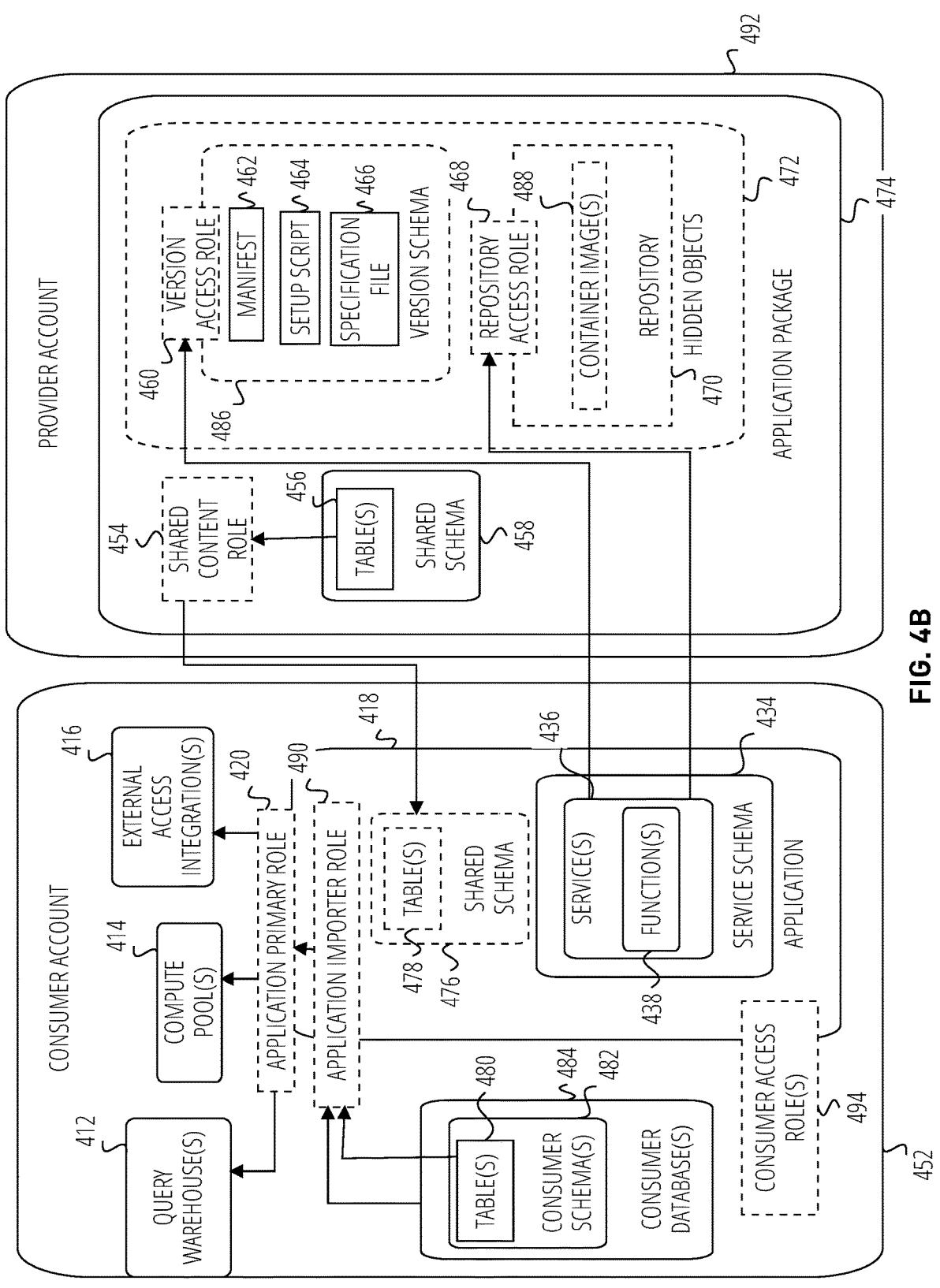
FIG. 4B illustrates a creation and execution of a container in a compute pool, according to some examples.

FIG. 4A illustrates an example container compute method 400 for controlling access of an application during execution on a data platform and FIG. 4B illustrates creation and execution of a container in a compute pool, according to some examples. Although the example container compute method 400 depicts a particular sequence of operations, the sequence may be altered without departing from the scope of the present disclosure. For example, some of the operations depicted may be performed in parallel or in a different sequence that does not materially affect the function of the container compute method 400. In other examples, different components of a data platform, such as data platform 102 of FIG. 1, that implement the container compute method 400 may perform functions at substantially the same time or in a specific sequence.

In operation 402, a consumer account 452 receives from a provider account 492 an instantiation of an application package 474. For a version of an application, the application version has a corresponding application package 474 including a version schema 486 having a manifest 462, a setup script 464, and one or more specification files, such as specification file 466, associated with a service schema 434. In some examples, an application 418 may have none or more service schemas. The service schema 434 includes one or more services 436 and functions 438. In some examples, the version schema 486 of the application package 474 may include other application support files including, but not limited to Java Archive (JAR) files, Python modules, data files, configuration files such as XML or JSON files, executable binaries for various operating systems, shell scripts for automation tasks, property files for application settings, libraries or dependencies required by the application, SQL scripts for database setup or migration, documentation files such as READMEs or user guides, license files detailing the software's terms of use, and the like.

In some examples, the manifest 462 specifies one or more container images 488 of the service schema 434 and privileges granted to the application 418. A setup script 464 specified by the manifest 462 defines the one or more services 436 and functions 438. The manifest 462 and the setup script 464 enable automated deployment by providing a structured outline of a configuration, privileges, and resource dependencies of the application 418 and the one or more services 436 and functions 438 of the service schema 434.

In some examples, the manifest 462 includes metadata such as version information, which assists in tracking and managing different iterations of the application package 474 and installed application 418 over time.

In some examples, the manifest 462 lists artifacts that are part of the application package 474, such as the setup script 464 that includes instructions for creating and configuring the service schema 434. In some examples, the setup script 464 includes execution parameters for a service 436 (of FIG. 4B) of the service schema 434. The setup script 464 automates the creation of necessary database objects, compute resources, and other setup tasks thus streamlining the deployment process of the service schema 434.

In some examples, the setup script 464 specifies one or more BRAC roles that are granted to the application 418 and to a consumer user who is the owner of the application 418 when the application 418 is installed in the consumer account 452. For example, an application primary role 420 is a role that is managed by the data platform 102. In some examples, the application primary role 420 is created implicitly and granted to the application 418 by the data platform 102 when the application 418 is installed in the consumer account 452. All objects in the application 418 are owned by, and run as, the application primary role 420. The application primary role 420 isolates the application 418 from the consumer user and vice versa. In some examples, the one or more services 436 and one or more functions 438 run as the primary application role 420 and inherit access to the components of the application 418 and any components of the data platform 102 to which the 418 has also been granted access.

In some examples, an application importer role 490 is managed by the data platform 102 and is granted to the application primary role 420 by the data platform 102. In some examples, the application importer role 490 is created implicitly with the application 418 is installed in the consumer account 452. All permissions the consumer user gives to the application 418 are granted to the application importer role. This is how the application 418 is allowed access to the consumer user owned objects such as, but not limited to, the one or more tables 480 in the one or more consumer schemas 482 of the one or more consumer databases 484.

In some examples, one or more consumer access roles 494 are created by the setup script 464 and are granted to the consumer user who is the owner of the installed application 418. In some examples, the consumer user may regrant the consumer access roles 494 to other entities or objects within the execution environment. Via the setup script 464, the application 418 grants privileges to objects within the application 418 to the consumer access roles to expose the objects to the consumer user.

In some examples, the application 418 uses the application primary role 420 to create one or more query warehouses 412, create one or more compute pools 414, and access one or more external access integrations 416 of the data platform 102.

In some examples, the application primary role 420 is created and managed on behalf of the application 418 by a proprietor of the data platform 102 (of FIG. 1) that hosts the consumer account 452 and the provider account 492. The application primary role 420 owns everything within the application and all code that executes in the application executes as the application primary role 420.

In some examples, the proprietor of the data platform 102 grants the application primary role 402 to the application 418.

In some examples, neither a consumer user having access to the consumer account 452 nor a provider user having access to the provider account 474 can be granted the application primary role 420.

In some examples, neither a consumer user having access to the consumer account 452 nor a provider user having access to the provider account 474 can grant the application primary role 420 to the application 418.

In some examples, in order for the application 418 to be able to create compute pools 414 and warehouses 412 (and other resources), a consumer user having access to the consumer account 452 grants these privileges to the application 418, this grant is conveyed to the application primary role 420 via an application importer role 490.

In some examples, the application 418 is granted an application importer role 490 used to access one or more consumer user objects such as, but not limited to, one or more consumer databases 484, consumer schemas 482, and consumer tables 480.

In some examples, the application importer role 490 is created by a proprietor of the data platform 102 that hosts the consumer account 452 and the provider account 492. The application importer role 490 is created as a hidden role on behalf of the application 418. The application importer role 490 is automatically granted to the application primary role 420. In order for the application 418 to access objects owned by the consumer user, the consumer grants access to the objects to the application 418 via the application importer role 490.

By declaring these parameters upfront, the manifest 462 provides that the service 436 has the authorizations to function correctly once deployed. An example manifest is illustrated below:

```
manifest_version: 1
version:
name: V1
artifacts:
readme: readme.md
setup_script: setup.sql
default_web_endpoint:
service: ux_schema.ux_service
endpoint: ui
images:—/database/schema/repository/image1
privileges:
    CREATE COMPUTE POOL description: " . . . "
    CREATE WAREHOUSE description: " . . . "
```

In some examples, a consumer user explicitly grants or approves requested privileges. These requested privileges are declared in the manifest both to drive UI that helps with this process, but also to allow the consumer user to understand what privileges the application will use should it be installed (e.g., a consumer user may decline to install an application if they are unwilling to grant the application certain permissions).

In some examples, the specification file 466 specifies components and attributes of one or more container images 488 of the service schema 434. The one or more container images 488 are given as one or more paths to a repository 470 associated with the versioned schema 486 of the application package 474 and used for execution of the service schema 434. A portion of an example spec file is illustrated below:

```
spec:
container:—name: main
image:/database/schema/repository/image1
env: DATA_PLATFORM_WAREHOUSE: warehouse
```

In some examples, the setup script 464 is used to create and initiate execution of the one or more services 436 and functions 438. The setup script 464 creates and configures the one or more services 436 and functions 438.

In some examples, the setup script 464 defines one or more consumer access roles 494 that are granted to the application owner in the environment of the consumer user. The consumer user may then grant the one or more consumer access roles 494 to other entities or objects of the data platform. In some examples, any object that the setup script 464 associates to a consumer access role of the one or more consumer access roles 494 becomes visible to the consumer user. An example setup script is illustrated below:

```
CREATE CONSUMER ACCESS ROLE app_user;
CREATE COMPUTE POOL "APP$POOL_1" . . . ;
CREATE WAREHOUSE "APP$QUERY_WH" . . . ;
CREATE SCHEMA IF NOT EXISTS service;
GRANT USAGE ON SCHEMA service TO CON-
    SUMER ACCESS ROLE app_user;
CREATE SERVICE service.app service
IN COMPUTE POOL "MY_APP$POOL_1"
QUERY_WAREHOUSE="APP$QUERY_WH"
SPECIFICATION_FILE='/spec. yaml';
CREATE FUNCTION service.test (x string)
RETURNS string
SERVICE=service.app service
ENDPOINT=test_endpoint AS '/test';
GRANT USAGE ON FUNCTION service.test (string)
    TO CONSUMER
APPLICATION ROLE app_user;
```

In some examples, the version schema 486 and the repository 470 are stored as hidden objects 472 within the provider account 492. Once an object is stored as a hidden object, a provider user who created the application package 474 cannot change the contents of the version schema 486 or the repository 470. However, the hidden version schema 486 and the contents of the repository 470, including the one or more container images 488, may be accessed by an entity using one or more access roles, such as version access role 460 and repository access role 468.

In operation 404, the data platform 102 defines one or more access roles based on the content of the application package 474. For example, when the application package 474 is created by a provider user, the data platform 102 creates an empty repository, such as repository 470, and an associated repository access role 468. When a new application version is added to the application package 474, the data platform 102 creates a version schema, such as version schema 486, and named storage location it to hold files of the corresponding version of the application. The data platform 102 creates an access role to access these materials, thus an application version gets its own unique access role. When an application, such as application 418, is accessed or executes code, the data platform 102 activates the appropriate roles, based upon the version of the application 418, giving the application 418 access to the resources used by the application 418.

In some examples, a shared content role 454 serves as a mechanism for managing access to shared resources within the application package 474 such as, but not limited to a shared schema 458 having one or more tables 456 that are shared by the provider account 492 with one or more consumer accounts. The shared content role 454 controls permissions and governs the visibility of shared content is visible in the application 418 as represented by shared schema 476 including one or more tables 478 The shared content role 454 is granted to specific components within installed applications of the application package 474 so that they may access shared content. The shared content role 454 provides that when the application 418 is installed in the consumer account 452, the shared resources are available according to the permissions defined by the provider user providing the application package 474. The shared content role 454 is useful in multi-consumer user environments where applications access common resources without compromising the isolation and security of individual consumer accounts. By leveraging this role, the data platform 102 can provide a controlled and secure method for sharing content for collaborative scenarios and for applications that use common datasets or services.

In some examples, a version access role 460 manages access to resources tied to specific versions within an application package 474. The version access role 460 provides that entities authorized to interact with a given version can do so, while maintaining isolation from other versions. The version access role 460 associates with resources such as schemas and scripts that are specific to a version of an application package 474. It controls interactions with these resources during deployment and execution of the application 418 and the one or more services 436 and functions 438 of the application 418. When updates occur or new versions of an application package are introduced, the version access role 460 facilitates access to the appropriate resources. The version access role 460 allows for application package lifecycle management within the data platform 102, enabling activities such as upgrades and maintenance while allowing consumer accounts to engage with the correct version of an application and related services and functions as determined by the permissions associated with the version access role 460.

In some examples, a repository access role 468 manages permissions for accessing container image repositories within the application package 474. This role is assigned to entities that interact with repositories containing the images used by applications, services, or functions. The repository access role 468 is used to access stored container images 488 used to create the services 436 and functions 438 of the service schema 434. The repository access role 468 governs the retrieval of images during the deployment and execution phases, ensuring that only authorized applications can pull the container images 488 for creation of the service schema 434. The repository access role 468 maintains the security and integrity of the application package 474 by controlling access to its container images 488.

In operation 406, the data platform 102 uses the version access role 460 to access the specification file 466 of the versioned schema 486. The data platform 102 executes the setup script 464 which creates the objects required by the application, which may include one or more compute pools 414, query warehouses 412, services 436 and functions 438 which may be utilized to access the services. When creating services 436, the setup script 464 contains instructions to configure compute pools 414, settings parameters and defining the environment in which services 436 will execute, and assigning services to the created compute pools. The specification file 466 is referenced during the creation of a service 436, which indicates the container images and resources required for the service to execute. Additionally, the setup script 464 may define consumer access roles 494 with which it may grant access to the created services 436 and functions 438 to the application owner.

The access roles ensure that the one or more services 436 and functions 438 of the service schema 434 operate within the boundaries of their authorized capabilities, maintaining data security and integrity. The access roles act as gatekeepers, allowing the one or more services 436 and functions 438 of the service schema 434 to access only those data objects that they have been explicitly permitted to access, thus preventing unauthorized data access or manipulation.

In some examples, one or more access roles are configured to be exclusive to the one or more services 436 and functions 438 and do not have associations with either a consumer user of the consumer account 452 or a provider user of the provider account 492. These exclusive roles are designed to facilitate specific interactions with and by the one or more services 436 and functions 438 of the service schema 434, ensuring that operations performed are within the scope of the one or more services 436 and functions 438 and are not influenced by external user permissions or privileges.

In some examples, an application primary role, such as application primary role 420, owns service objects, such as the one or more services 436, of the application 418 which prevents a consumer user from influencing the internal operations of the application 418.

In some examples, a consumer access role, such as a consumer access role of the one or more consumer access roles 494, allows a consumer user using the consumer account 452 access to specified objects of the application 418 and scopes the access to those specified objects.

In some examples, the exclusivity of the one or more application roles to the one or more services 436 and functions 438 allows for a controlled execution environment where the integrity of the execution of the service schema 434 is maintained. This design prevents unauthorized access or modifications to the service schema 434 by users who do not have the necessary permissions, thereby upholding the security protocols established by the data platform 102 and protecting the integrity of the intellectual property of the provider user who created the application package 474.

In some examples, the design further provides that objects contained within the application 418 that have not had access granted through consumer access roles, remain entirely hidden and inaccessible to the consumer user, protecting the provider's implementation and intellectual property.

In some examples, by restricting the one or more application roles to the objects of the service schema 434, the data platform 102 can enforce a clear separation of duties and access rights. This separation is useful in multi-tenant environments where services may be deployed across various consumer accounts, each with different users and access requirements. The exclusive roles ensure that each service operates independently of users' actions, providing a reliable and consistent execution of the functions of the service schema 434 as provided for by the application package 474.

In some examples, one or more compute pools 414 provide a dedicated environment for the execution of the service schema 434. When containers are commingled in a single compute pool, the services of the provider user could "attack" the services of the consumer user such as, but not limited to, trying to exfiltrate data or proprietary logic and, similarly, the services of the consumer user could do the same to the provider. In contrast to multiple services sharing a compute pool, for each application, the data platform 102 restricts a compute pool to a single application. This provides that the containers for the application are isolated from the consumer's services.

The one or more compute pools 414 operate as account-level constructs where jobs and services are executed. Compute pools 414 furnish the computational resources necessary for the operation of long-running services and finite lifespan jobs.

The one or more compute pools 414 are created and configured by the setup script 464. The setup script 464 is responsible for defining the parameters of the one or more compute pools 414, such as the minimum and maximum number of nodes, thereby enabling the one or more compute pools 414 to scale according to the demands of the service schema 434. The configuration of the one or more compute pools 414 directly influences the performance and scalability of the one or more services 436. Once created, the one or more compute pools 414 host the one or more services 436 of the application 418 with access to CPUs, memory, and other system resources required for execution. The one or more services 436 and functions 438, upon execution in the one or more compute pools 414, are capable of accessing data objects within the data platform 102 according to the one or more access roles, utilizing the resources of the one or more compute pools 414 to perform operations. In some examples, the one or more compute pools 414 are designed to isolate the one or more services 436, ensuring that the one or more services 436 execute within the compute pool 414 in a segregated manner from other services and resources not explicitly specified for the service schema 434 within the application 418. This isolation provides for maintaining the integrity and security of the service schema 434 and the one or more services 436.

In some examples, multiple services from different service schemas may be executed in the same compute pool. The segregation is between services in one app and all the other services created by consumer user applications or different applications.

In some examples, the one or more query warehouses 412 serve as dedicated environments for executing SQL queries that are issued by the one or more services 436. These warehouses are provisioned with the necessary compute resources to perform data processing tasks required by the one or more services 436 of the service schema 434. In some examples, the setup script 464 may contain commands to instantiate the one or more query warehouses 412 with specific performance characteristics, such as warehouse size or compute power, tailored to the service schema 434. The setup script 464 provides that the one or more query warehouses 412 are associated with the service schema 434, allowing the service schema 434 to perform data operations within the context of the consumer account 452.

Once the one or more query warehouses 412 are created, the one or more services 436 and functions 438 can begin querying one or more objects of the data platform 102. The one or more services 436 utilize the query warehouses to execute SQL queries, leveraging the compute resources of the one or more query warehouses 412 to interact with databases, tables, or other data objects stored within the data platform 102. The one or more consumer access roles 494, which were created by the data platform 102 when the application was installed, govern the permissions used by the one or more services 436 and functions 438 of the service schema 434 to access and query these data objects.

An example command to create a service using the is illustrated below:

CREATE SERVICE my_service
IN COMPUTE POOL compute pool
SPECIFICATION_FILE='specification_file.yaml'
MIN_INSTANCES=2
MAX_INSTANCES=2;

The create command creates a service within a compute pool and a specification file is referenced from a versioned schema using a schema access role. A specification file includes details such as the name of a container image and a path to the container image to be used to create the service that is hosted by a compute pool. In some examples, the specification file includes the configuration for the service, ensuring that one or more containers of the service operate with the correct settings and parameters.

In some examples, a setup script defines a minimum and maximum number of instances for a service. The service is executed within a compute pool with defined minimum and maximum number of instances. This determines the scaling behavior of the service within the compute pool.

In some examples, a consumer user can grant permissions to an application 418 to create query warehouses. A query warehouse created by the application 418 is owned by the application 418. The consumer user can take over ownership and control of the query warehouse to shut it down in an emergency.

In some examples, once the consumer user has granted an access role the ability to create a query warehouse to the application 418, the consumer user cannot control the number of query warehouses that the application creates. In some examples, the consumer user has no control over the size of the query warehouses created.

In some examples, a consumer user can programmatically create a query warehouse on behalf of the application 418. The consumer user can directly grant the query warehouse to the application 418. In some examples, the consumer user uses an API to directly communicate the name of the query warehouse to the application 418. In some examples, a query warehouse can be passed by reference to an application 418.

In some examples, a consumer user can grant permission to an application to create compute pools. Once created, the application owns the compute pool and can automatically adjust a size or configuration of the compute pool based upon workload. In some examples, application-owned compute pools cannot host services or executable objects from other application instances or from the consumer user.

In some examples, a consumer user creates a compute pool on behalf of an application. Such a compute pool is explicitly and exclusively dedicated to the application. In some examples, the compute pool is directly granted to the application for deploying services, using an API of the application.

In some examples, the architecture of the data platform incorporates stringent isolation measures within the compute pools to mitigate the risk of inter-service interference and potential security breaches. These measures are designed to prevent services that are executing concurrently in compute pools, from engaging in activities that could compromise the integrity of other services or lead to the unauthorized exposure of sensitive data or intellectual property.

In some examples, isolation is achieved through a combination of virtualization and access control mechanisms. Each container of a service runs in its own virtualized container, and a compute pool represents an isolated and virtualized environment in which these containers execute. One or more services may be hosted in a compute pool, but the containers of those services may directly communicate and see each other while services in other compute pools cannot do so without explicit permission through a RBAC system, effectively creating a sandbox that restricts the container of a service's operations to its own allocated resources. This virtualization provides that each container of a service has access to its own dedicated set of resources, such as CPU, memory, and storage, thereby eliminating the possibility of one container of a service consuming resources allocated to another container of a service. Furthermore, the data platform enforces access controls at the service level, which are defined by the one or more access roles associated with each service. These roles delineate the permissions and capabilities of the service, specifying which resources and data the service is authorized to access. The access roles are configured to prevent any service from accessing data or resources that are outside the scope of its defined permissions. In some examples, a capability of a service to access objects or resources is defined by access roles including, but not limited to, an application primary role 420, an application importer role 490, a version access role 460, and a repository access role 568. In some examples, one or more consumer access roles 494 define which entities can access the one or more services 436.

For example, a service that is authorized to access a particular database within the data platform will be unable to access another database that it has not been granted permissions for. Similarly, if a service attempts to perform operations that could potentially lead to the exposure of IP, such as accessing the underlying container images or source code of another service, the access control mechanisms will block such operations.

In some examples, as a service accesses underlying images that the service was deployed from and operates on the source code, protection of the IP of the provider user is provided for through the use of access roles. For example, provider user IP protection is provided by preventing a consumer user accessing the underlying images, guaranteed by a repository access role 468 which is not grantable to the consumer user. In some examples, The consumer can't deploy another service in the compute pool exclusive to an application, preventing consumer created services from interfering with the services owned by the application.

In some examples, consumer IP protection is provided for by preventing services deployed by an application accessing container images or source code of another service owned by the consumer user if the consumer does not explicitly grant access to the application.

By implementing these isolation and access control measures, a data platform provides that services executing within compute pools are contained within their respective operational boundaries. This approach effectively prevents services from attacking each other, whether intentionally or unintentionally, and safeguards against the exposure of sensitive data and IP.

In operation 408, the one or more services 436 are executed in the one or more compute pools 414 and the one or more services 436 access objects of the application package 474 and of the data platform 102 using the one or more access roles.

In some examples, a data platform scans container images of a service for security vulnerabilities before a service is executed in a compute pool.

Figure 5:
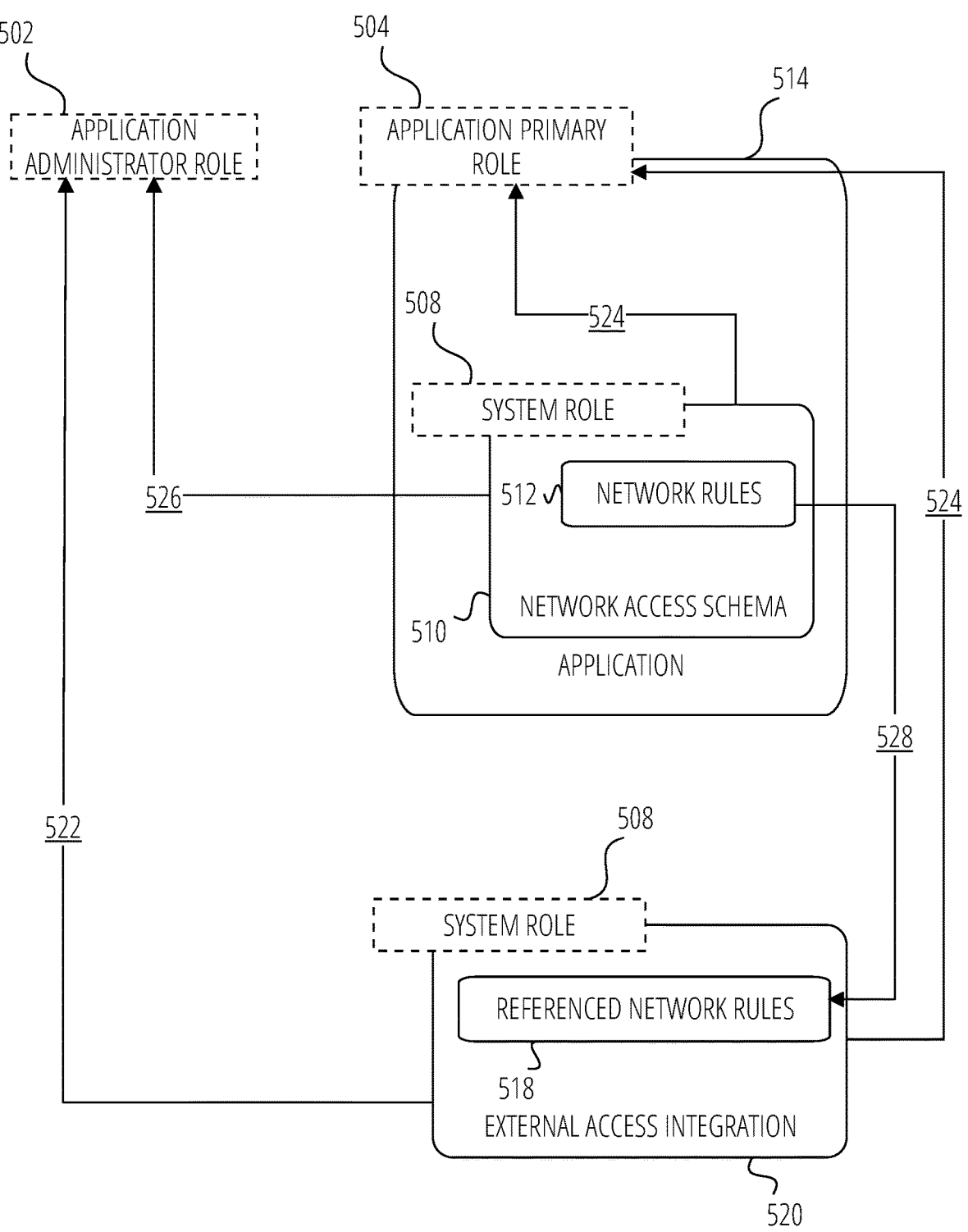
FIG. 5 is an illustration of a framework of an external access integration 520, according to some examples.

FIG. 5 is an illustration of a framework of an external access integration 520, according to some examples. A service or function establishes connections with external networks while maintaining security protocols to protect both consumer user's and a provider user's data and intellectual property. For example, a service or function of an application 514 uses an external access integration 520 that acts as a controlled gateway for the service or function to interact with external entities. The external access integration 520 is owned by an entity having a system role 508 and is configured with one or more sets of network rules, such as network rules 512 and 518 that dictate the permissible external endpoints of the service 436. These network rules are similar to firewall settings, providing a filter that only allows traffic to and from external hosts, networks, or services in accordance with approved security protocols. Control over the external access integration 520 is maintained by specifying the allowed network rules, thereby ensuring that any data exchange with external systems adheres to the established security policies.

In some examples, a network access schema 510 is provided within the application's environment on the data platform 102 and is owned by an entity having a system role 508. The network access schema 510 serves as a repository for one or more network rules 512 that are created and managed by an application primary role 504 of the application 514. In some examples, the network rules 512 are not automatically active or enforceable. Instead, they are proposed rules that require approval 528 from a higher-level role with the appropriate authority, such as a process using an application owner role. Once a network rule is reviewed and approved 528, the network rule can be referenced as part of referenced network rules 518 included in the configuration of the external access integration 520, thereby becoming part of the active set of rules that govern usage 524 of the external access integration 520 by the application 514 or a service of the application 514. In some examples, an entity having an application administrator role 502 can view the network access schema 510.

In some examples, the application 514 creates the one or more network rules 512 in the network access schema 510. Once created, these network rules may be deleted, but may not be changed, by the application 514. The approval 528, done by someone with the administrator role application administrator role 502, involves referencing the network rule 512 by the external access integration 520 a referenced network rules 518. This prevents the application 514 from changing a network rule of the network rules 512 after the network rule has been approved by an administrator.

In some examples, an application administrator role 502 is granted specific configuration permissions that allow configuration 522 and usage 526 of the external access integration 520. The application administrator role 502 provides for defining the network rules 512 and network rules 518 within the external access integration 520

In some examples, the external access integration 520 is a dynamic component that can be updated as the external communication requirements of services evolve. For example, as new external endpoints are deemed safe and necessary for a service's operation, the external access integration 520 can be reconfigured to include additional network rules. Conversely, if certain external endpoints are no longer required or are considered a security risk, they can be removed from the configuration of the external access integration 520.

Figure 6:
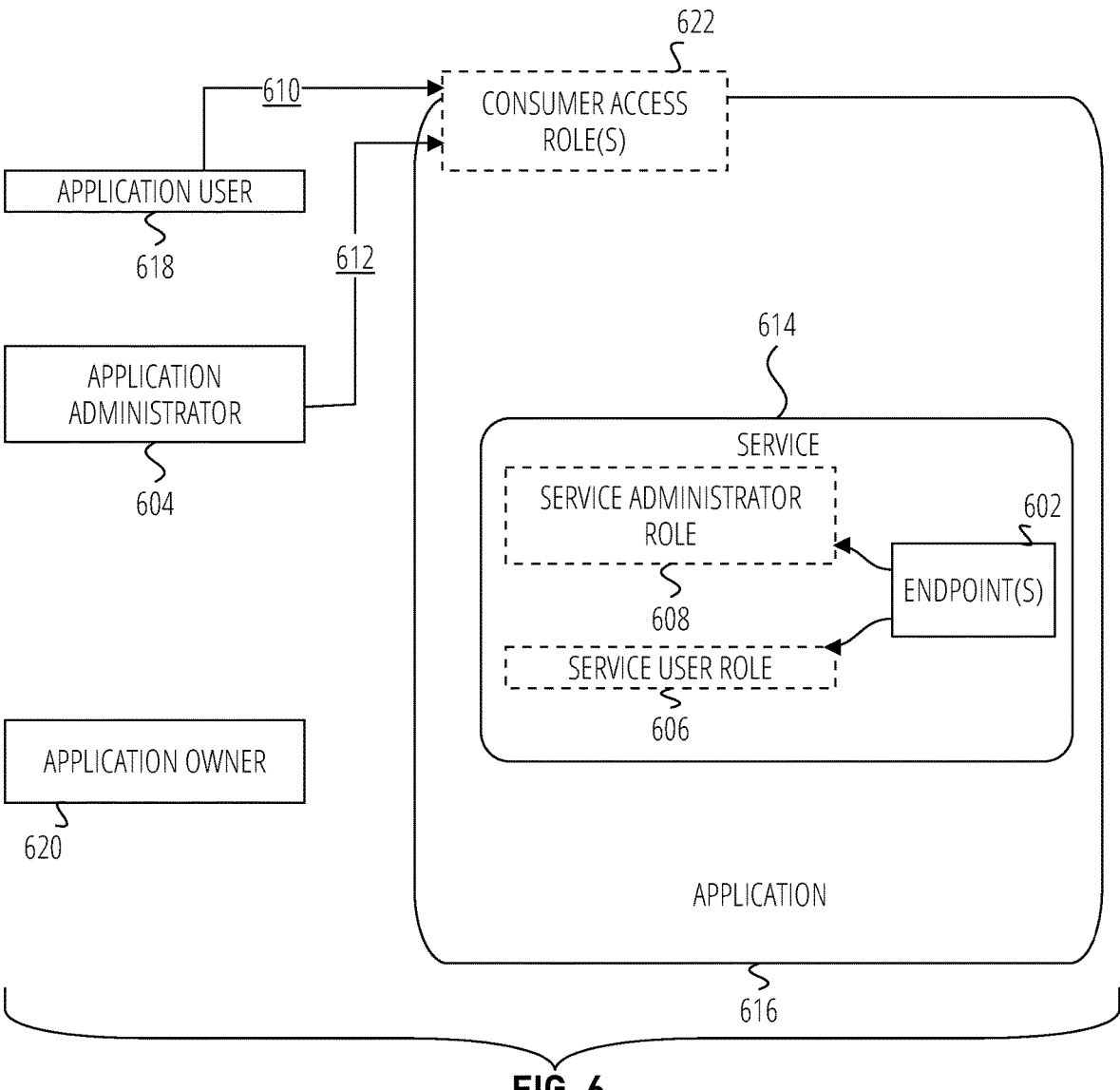
FIG. 6 illustrates a framework for providing external endpoints by a service 614, according to some examples.

FIG. 6 illustrates a framework for providing public and private endpoints by a service 614, according to some examples. The service 614 provides one or more endpoints 602 for use by an application owner 620, application user 618, or other entity having an appropriate access role such as consumer access role 622. An endpoint serves as a designated interface for services, such as service 614, to allow systems external to a data platform, such as data platform 102 (of FIG. 1), to interact with a service or for internal communication between different components of an application. The endpoint facilitates the flow of data in and out of the service 614, enabling the service 614 to perform its intended functions.

In some examples, each endpoint has independent access control. This feature allows for granular control over who can access specific endpoints of a service, ensuring that only authorized users or systems can interact with each endpoint. The ability to manage access control for each endpoint individually means that different endpoints of the same service can have distinct access policies. For instance, one endpoint of a service might be publicly accessible, serving as an API endpoint for general use, while another endpoint might be restricted to internal use within the data platform 102, accessible only to certain roles or services. Independent access control feature enhances the security posture of services by allowing for a least privilege access model, where entities are granted only the permissions necessary to perform their tasks. It also provides flexibility in service design, enabling the creation of multi-faceted services with endpoints tailored to different user groups or use cases.

In some examples, access control to an endpoint is managed by defining roles that are scoped to the service. These roles encapsulate the permissions required to interact with the endpoint. For example, a service may have a service administrator role 608 used by an application administrator 604. The service administrator role 608 is granted with permissions to access administrative endpoints for service management tasks, while a service user role 606 is used by an application user 618 and the service user role is granted with permissions to access an endpoint for using the service.

In some examples, a service user role has access to some endpoints for using the service to perform data operations, but has no access to the administrative endpoints.

In some examples, an application owner 620 might have permissions to access only the public API endpoints.

In some examples, endpoints are exposed to consumer users by granting service scoped roles to one or more consumer access roles 622.

In some examples, an endpoint is entirely hidden from consumers and only indirectly exposed as user-defined functions in SQL.

In some examples, when an endpoint is created or configured, a setup script specifies which roles are allowed to access the endpoint. This specification is enforced by an access manager 202 (of FIG. 2), which checks the roles of users or services making requests to the endpoint and grants or denies access based on the configured policies.

In some examples, the endpoint is defined within a specification file of the application package of the application 418. The specification file details the attributes of the endpoint, such as its name, the network port it listens on, the protocol it uses, and any public accessibility settings. For example, an endpoint might be configured to listen on port

8080 using the HTTP protocol and be marked as public, allowing it to receive web traffic from outside the data platform. This configuration enables the service 614 to serve web pages or APIs that can be consumed by users or other applications over the internet or within an internal network.

In some examples, endpoints can also be secured with various authentication and authorization mechanisms to ensure that only legitimate and authorized requests are processed. This might involve the use of API keys, OAuth tokens, or other security credentials that are verified before granting access to the service's functionality.

In some examples, the data platform provides tools and interfaces for managing endpoints, such as creating, updating, or deleting them as the requirements of the service evolve. This management is typically performed by roles with the necessary permissions, ensuring that changes to endpoints are controlled and auditable.

In some examples, the one or more endpoints 602 may be exposed to an application user 618 or may be used solely by the application 616 to provide the service 614.

Figure 7:
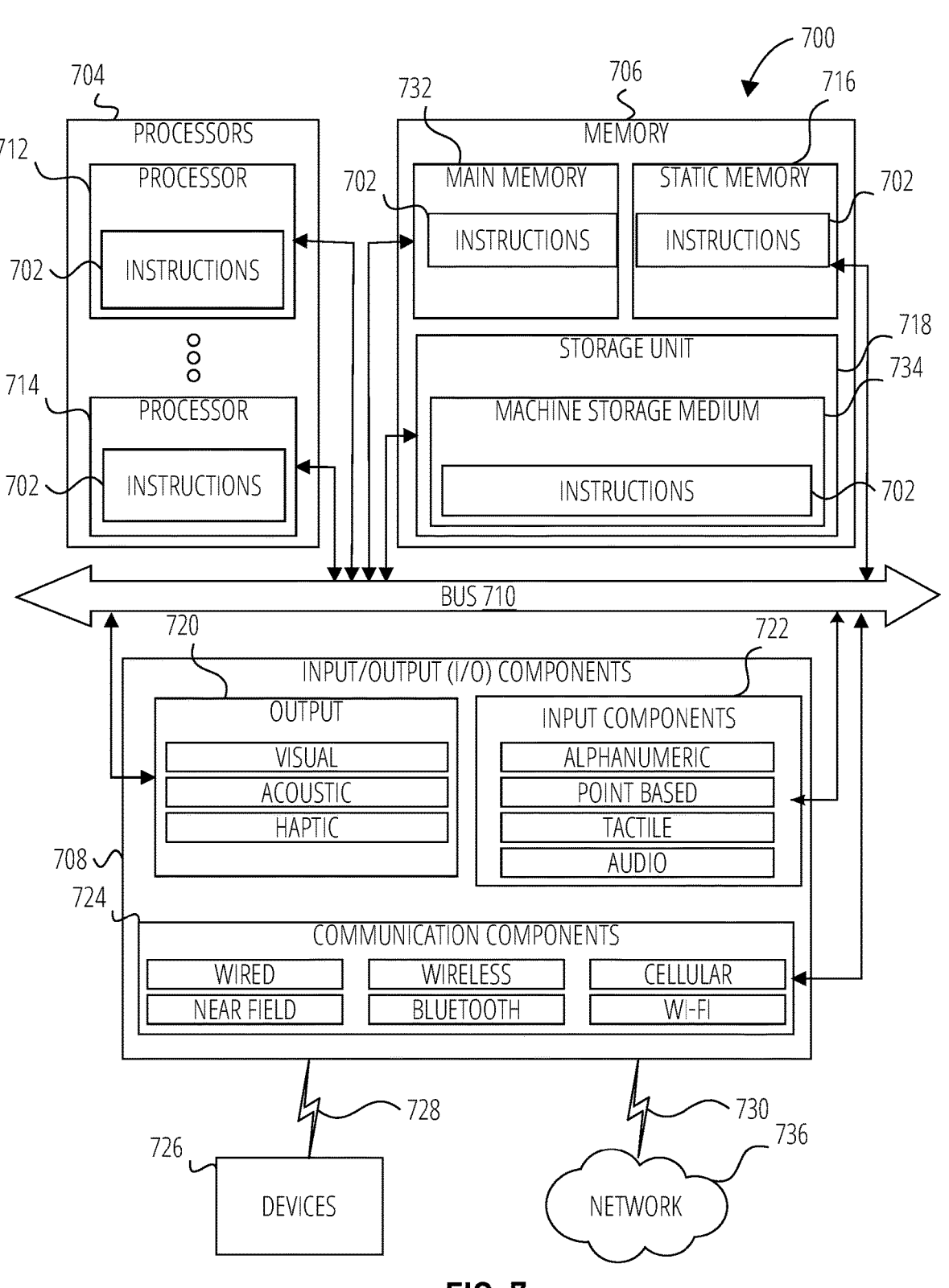
FIG. 7 illustrates a diagrammatic representation of a machine in the form of a computer system within which a set of instructions may be executed for causing the machine to perform any one or more of the methodologies discussed herein, according to some examples.

FIG. 7 illustrates a diagrammatic representation of a machine 700 in the form of a computer system within which a set of instructions may be executed for causing the machine 700 to perform any one or more of the methodologies discussed herein, according to examples. Specifically, FIG. 7 shows a diagrammatic representation of the machine 700 in the example form of a computer system, within which instructions 702 (e.g., software, a program, an application, an applet, an application, or other executable code) for causing the machine 700 to perform any one or more of the methodologies discussed herein may be executed. For example, the instructions 702 may cause the machine 700 to execute any one or more operations of any one or more of the methods described herein. In this way, the instructions 702 transform a general, non-programmed machine into a particular machine 700 (e.g., the compute service manager 104, the execution platform 110, and the data storage devices 1 to N of data storage 106) that is specially configured to carry out any one of the described and illustrated functions in the manner described herein.

In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 702, sequentially or otherwise, that specify actions to be taken by the machine 700. Further, while only a single machine 700 is illustrated, the term "machine" shall also be taken to include a collection of machines that individually or jointly execute the instructions 702 to perform any one or more of the methodologies discussed herein.

The machine 700 includes hardware processors 704, memory 706, and I/O components 708 configured to communicate with each other such as via a bus 710. In some examples, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 712 and a processor 714 that may execute the instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 may include a main memory 732, a static memory 716, and a storage unit 718 including a machine storage medium 734, all accessible to the processors 704 such as via the bus 710. The main memory 732, the static memory 716, and the storage unit 718 store the instructions 702 embodying any one or more of the methodologies or functions described herein. The instructions 702 may also reside, completely or partially, within the main memory 732, within the static memory 716, within the storage unit 718, within at least one of the processors 704 (e.g., within the processor's cache memory), or any suitable combination thereof, during execution thereof by the machine 700.

The input/output (I/O) components 708 include components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various examples, the I/O components 708 may include output components 720 and input components 722. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 708 may include communication components 724 operable to couple the machine 700 to a network 736 or devices 726 via a coupling 730 and a coupling 728, respectively. For example, the communication components 724 may include a network interface component or another suitable device to interface with the network 736. In further examples, the communication components 724 may include wired communication components, wireless communication components, cellular communication components, and other communication components to provide communication via other modalities. The devices 726 may be another machine or any of a wide variety of peripheral devices (e.g., a peripheral device coupled via a universal serial bus (USB)). For example, as noted above, the machine 700 may correspond to any one of the compute service manager 104, the execution platform 110, and the devices 726 may include the data storage device 226 or any other computing device described herein as being in communication with the data platform 102 or the data storage 106.

The various memories (e.g., 706, 716, 732, and/or memory of the processor(s) 704 and/or the storage unit 718) may store one or more sets of instructions 702 and data structures (e.g., software) embodying or utilized by any one or more of the methodologies or functions described herein. These instructions 702, when executed by the processor(s) 704, cause various operations to implement the disclosed examples.

Described implementations of the subject matter can include one or more features, alone or in combination as illustrated below by way of example:

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 736 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 730 may be a Code Division Multiple Access (CDMA) connection, a Global System for Mobile communications (GSM) connection, or another type of cellular or wireless coupling. In this example, the coupling 730 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 702 may be transmitted or received over the network 736 using a transmission medium via a network interface device (e.g., a network interface component included in the communication components 724) and utilizing any one of a number of well-known transfer protocols (e.g., hypertext transfer protocol (HTTP)). Similarly, the instructions 702 may be transmitted or received using a transmission medium via the coupling 728 (e.g., a peer-to-peer coupling) to the devices 726. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Described implementations of the subject matter can include one or more features, alone or in combination as illustrated below by way of example.

Example 1 is a machine-implemented method, comprising: receiving, by a consumer account of a data platform, an application from an application package of a provider account of the data platform, the application including a setup script and a manifest of a service provided by the application; activating one or more access roles based on the manifest; creating the service and a compute pool of the data platform using the setup script and a specification file accessed from the application package using an access role of the one or more access roles; and executing the service in the compute pool, the service accessing objects of the application package and of the data platform using the one or more access roles.

In Example 2, the subject matter of Example 1 includes, wherein the one or more access roles are exclusive to the service and are not associated with a consumer user of the consumer account or a provider user of the provider account.

In Example 3, the subject matter of any of Examples 1-2 includes, creating a query warehouse of the data platform using the setup script; and querying, by the service, one or more objects of the data platform using the query warehouse and the one or more access roles.

In Example 4, the subject matter of any of Examples 1-3 includes, wherein one or more components of the application package are stored in a hidden repository within the provider account, the one or more components of the application package hidden from a provider user of the provider account.

In Example 5, the subject matter of any of Examples 1-4 includes, wherein the service specification file includes a list of container images and their corresponding versions to be used by the service.

In Example 6, the subject matter of any of Examples 1-5 includes, scanning the container images for security vulnerabilities before the service is executed in the compute pool.

In Example 7, the subject matter of any of Examples 1-6 includes, isolating the compute pool to prevent the service from accessing other services or resources not specified in the application package.

In Example 8, the subject matter of any of Examples 1-7 includes, wherein the compute pool is exclusively dedicated to the service.

In Example 9, the subject matter of any of Examples 1-8 includes, enabling the service to communicate with external networks through an external access integration that is configured and controlled by the consumer account.

In Example 10, the subject matter of any of Examples 1-9 includes, wherein the setup script defines one or more network rules for the external access integration that control communication between the service and the external networks.

Example 11 is at least one machine-readable medium including instructions that, when executed by processing circuitry, cause the processing circuitry to perform operations to implement any of Examples 1-10.

Example 12 is an apparatus comprising means to implement any of Examples 1-10.

Example 13 is a system to implement any of Examples 1-10.

Example 14 is a method to implement any of Examples 1-10.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A machine-implemented method, comprising:
   receiving, in a consumer account of a data platform, an application from an application package of a provider account of the data platform, the application including a setup script and a manifest of a service provided by the application, the application package comprising one or more components stored in a hidden repository within the provider account by the data platform, the one or more components hidden from a provider user of the provider account by the data platform such that the provider user cannot access or change the one or more components after installation of the application;
   activating one or more access roles based on the manifest;
   creating the service and a compute pool of the data platform using the setup script and a specification file accessed from the application package using an access role of the one or more access roles; and
   executing the service in the compute pool, the executing of the service including accessing objects of the application package and of the data platform using the one or more access roles.

2. The machine-implemented method of claim 1, wherein the one or more access roles are exclusive to the service and are not associated with a consumer user of the consumer account or a provider user of the provider account.

3. The machine-implemented method of claim 1, further comprising:
   creating a query warehouse of the data platform using the setup script; and
   querying, by the service, one or more objects of the data platform using the query warehouse and the one or more access roles.

4. The machine-implemented method of claim 1, wherein the service specification file includes a list of container images and corresponding versions to be used by the service.

5. The machine-implemented method of claim 4, further comprising scanning the container images for security vulnerabilities before the service is executed in the compute pool.

6. The machine-implemented method of claim 1, further comprising:
   isolating the compute pool to prevent the service from accessing other services or resources not specified in the application package.

7. The machine-implemented method of claim 6, wherein the compute pool is exclusively dedicated to the service.

8. The machine-implemented method of claim 1, further comprising:
   enabling the service to communicate with external networks through an external access integration that is configured and controlled by the consumer account.

9. The machine-implemented method of claim 8, wherein the setup script defines one or more network rules for the external access integration that control communication between the service and the external networks.

10. A system comprising:
    at least one hardware processor; and
    at least one memory storing instructions that, when executed by the at least one hardware processor, cause the system to perform operations comprising:
    receiving, in a consumer account of a data platform, an application from an application package of a provider account of the data platform, the application including a setup script and a manifest of a service provided by the application, the application package comprising one or more components stored in a hidden repository within the provider account by the data platform, the one or more components hidden from a provider user of the provider account by the data platform such that the provider user cannot access or change the one or more components after installation of the application;
    activating one or more access roles based on the manifest;
    creating the service and a compute pool of the data platform using the setup script and a specification file accessed from the application package using an access role of the one or more access roles; and
    executing the service in the compute pool, the executing of the service including accessing objects of the application package and of the data platform using the one or more access roles.

11. The system of claim 10, wherein the one or more access roles are exclusive to the service and are not associated with a consumer user of the consumer account or a provider user of the provider account.

12. The system of claim 10, wherein the operations further comprise:
    creating a query warehouse of the data platform using the setup script; and
    querying, by the service, one or more objects of the data platform using the query warehouse and the one or more access roles.

13. The system of claim 10, wherein the service specification file includes a list of container images and corresponding versions to be used by the service.

14. The system of claim 13, wherein the operations further comprise scanning the container images for security vulnerabilities before the service is executed in the compute pool.

15. The system of claim 10, wherein the operations further comprise:
    isolating the compute pool to prevent the service from accessing other services or resources not specified in the application package.

16. The system of claim 15, wherein the compute pool is exclusively dedicated to the service.

17. The system of claim 10, wherein the operations further comprise:
    enabling the service to communicate with external networks through an external access integration that is configured and controlled by the consumer account.

18. The system of claim 17, wherein the setup script defines one or more network rules for the external access integration that control communication between the service and the external networks.

19. A machine-storage medium storing instructions that, when executed by one or more processors, cause the one or more processors to perform operations comprising:

receiving, in a consumer account of a data platform, an application from an application package of a provider account of the data platform, the application including a setup script and a manifest of a service provided by the application, the application package comprising one or more components stored in a hidden repository within the provider account by the data platform, the one or more components hidden from a provider user of the provider account by the data platform such that the provider user cannot access or change the one or more components after installation of the application;

activating one or more access roles based on the manifest;

creating the service and a compute pool of the data platform using the setup script and a specification file accessed from the application package using an access role of the one or more access roles; and executing the service in the compute pool, the executing of the service including accessing objects of the application package and of the data platform using the one or more access roles.

20. The machine-storage medium of claim 19, wherein the one or more access roles are exclusive to the service and are not associated with a consumer user of the consumer account or a provider user of the provider account.

21. The machine-storage medium of claim 19, wherein the operations further comprise:

creating a query warehouse of the data platform using the setup script; and querying, by the service, one or more objects of the data platform using the query warehouse and the one or more access roles.

22. The machine-storage medium of claim 19, wherein the service specification file includes a list of container images and corresponding versions to be used by the service.

23. The machine-storage medium of claim 22, wherein the operations further comprise scanning the container images for security vulnerabilities before the service is executed in the compute pool.

24. The machine-storage medium of claim 19, wherein the operations further comprise:

isolating the compute pool to prevent the service from accessing other services or resources not specified in the application package.

25. The machine-storage medium of claim 24, wherein the compute pool is exclusively dedicated to the service.

26. The machine-storage medium of claim 19, wherein the operations further comprise:

enabling the service to communicate with external networks through an external access integration that is configured and controlled by the consumer account.

27. The machine-storage medium of claim 26, wherein the setup script defines one or more network rules for the external access integration that control communication between the service and the external networks.

\* \* \* \* \*